(12) United States Patent
Nair

(10) Patent No.: US 10,657,100 B2
(45) Date of Patent: May 19, 2020

(54) FILE MANAGEMENT SYSTEM

(71) Applicant: PAYPAL, INC., San Jose, CA (US)

(72) Inventor: Rahul Nair, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 501 days.

(21) Appl. No.: 15/082,168

(22) Filed: Mar. 28, 2016

(65) Prior Publication Data

US 2017/0277706 A1    Sep. 28, 2017

(51) Int. Cl.
*G06F 16/16* (2019.01)
*H04L 12/58* (2006.01)
*G06F 16/901* (2019.01)

(52) U.S. Cl.
CPC ........ *G06F 16/168* (2019.01); *G06F 16/9017* (2019.01); *H04L 51/08* (2013.01); *H04L 51/22* (2013.01)

(58) Field of Classification Search
CPC ............. G06F 3/04817; G06F 3/04842; G06F 17/30126; G06F 17/3056; G06F 3/0481; H04L 51/00; H04L 51/36
See application file for complete search history.

(56) References Cited

U.S. PATENT DOCUMENTS

| | | | | |
|---|---|---|---|---|
| 8,856,241 B1* | 10/2014 | Derhak | ................... | H04L 51/00 709/206 |
| 8,914,856 B1* | 12/2014 | Velummylum | ......... | H04L 63/08 726/19 |
| 9,395,893 B1* | 7/2016 | Beausoleil | .......... | G06F 3/04842 707/608 |
| 2008/0263636 A1* | 10/2008 | Gusler | .................. | G06F 21/316 726/4 |
| 2010/0144314 A1* | 6/2010 | Sherkin | ................... | G06F 21/33 455/411 |
| 2012/0072392 A1* | 3/2012 | Crowhurst | ............. | G06Q 10/10 707/608 |
| 2013/0238730 A1* | 9/2013 | Nir | .......................... | H04L 51/08 709/206 |
| 2014/0181223 A1* | 6/2014 | Homsany | ................ | H04L 51/08 709/206 |

* cited by examiner

*Primary Examiner* — Yuk Ting Choi
(74) *Attorney, Agent, or Firm* — Haynes and Boone, LLP

(57) ABSTRACT

Systems and methods for providing a file management system include a system provider device that receives, through communication over a network with a user device, a request to create a file management account. The system provider device may then provide a DBMS layer that interfaces and mediates communication between a webmail file system and a UI application. In some cases, the webmail file system includes file storage for at least one webmail provider, and the at least one webmail provider includes a user webmail account. Thereafter, the system provider device may copy a file into the UI application by attaching the file to a draft email within the user webmail account, where the draft email including the attached file is saved in the file storage for the at least one webmail provider.

19 Claims, 14 Drawing Sheets

FILE MANAGEMENT SYSTEM

BACKGROUND

The present disclosure generally relates to a file management system, and more particularly to a file management system including an online document storage system that leverages webmail-provided storage to provide the online document storage system.

More and more individuals rely on electronic networks, such as the Internet, for a variety of services including purchasing products (e.g., from merchants and/or individuals), to exchange electronic mail, to conduct audio and/or video conferencing, to participate in online chats, to browse the World Wide Web, to play games, for electronic banking, and for electronic file storage and access, among others. Considering the case of file storage and access, and as merely one example, Dropbox, Inc. of San Francisco, Calif. provides a file hosting service that allows users to place files into a specified folder on the user's computing device (e.g., laptop, desktop, mobile device, etc.), where files placed into the specified folder are copied and stored online (e.g., into specified user-allocated storage). In various examples, the files stored online may be accessed via a service provider website (e.g., Dropbox website) or via a mobile application.

Currently, however, a user is limited as to the amount of file storage available to them. In particular, file hosting services such as Dropbox generally operate according to a "freemium" pricing model, where users are allocated limited free storage space (e.g., 2 GB for Dropbox) while having to pay for any additional storage space. As such, users may prefer to find alternate free online storage space rather than pay for additional storage. For example, in some cases, users may opt to create multiple accounts for a number of different file hosting services in order to take advantage of the free storage space offered by each file hosting service. However, such an exercise can add complexity and time for a user, for example, trying to remember in which account a particular file was stored. Thus, users may be faced with having to inconveniently juggle multiple file hosting service accounts or pay a premium for additional storage space with their file hosting service of choice.

Thus, there is a need for a file management system including an online document storage system that leverages webmail-provided storage to provide the online document storage system.

BRIEF DESCRIPTION OF THE FIGURES

FIG. 6B illustrates a user simulation module layer inserted between the UI and the webmail providers to mediate communication there between;

Figure 1:
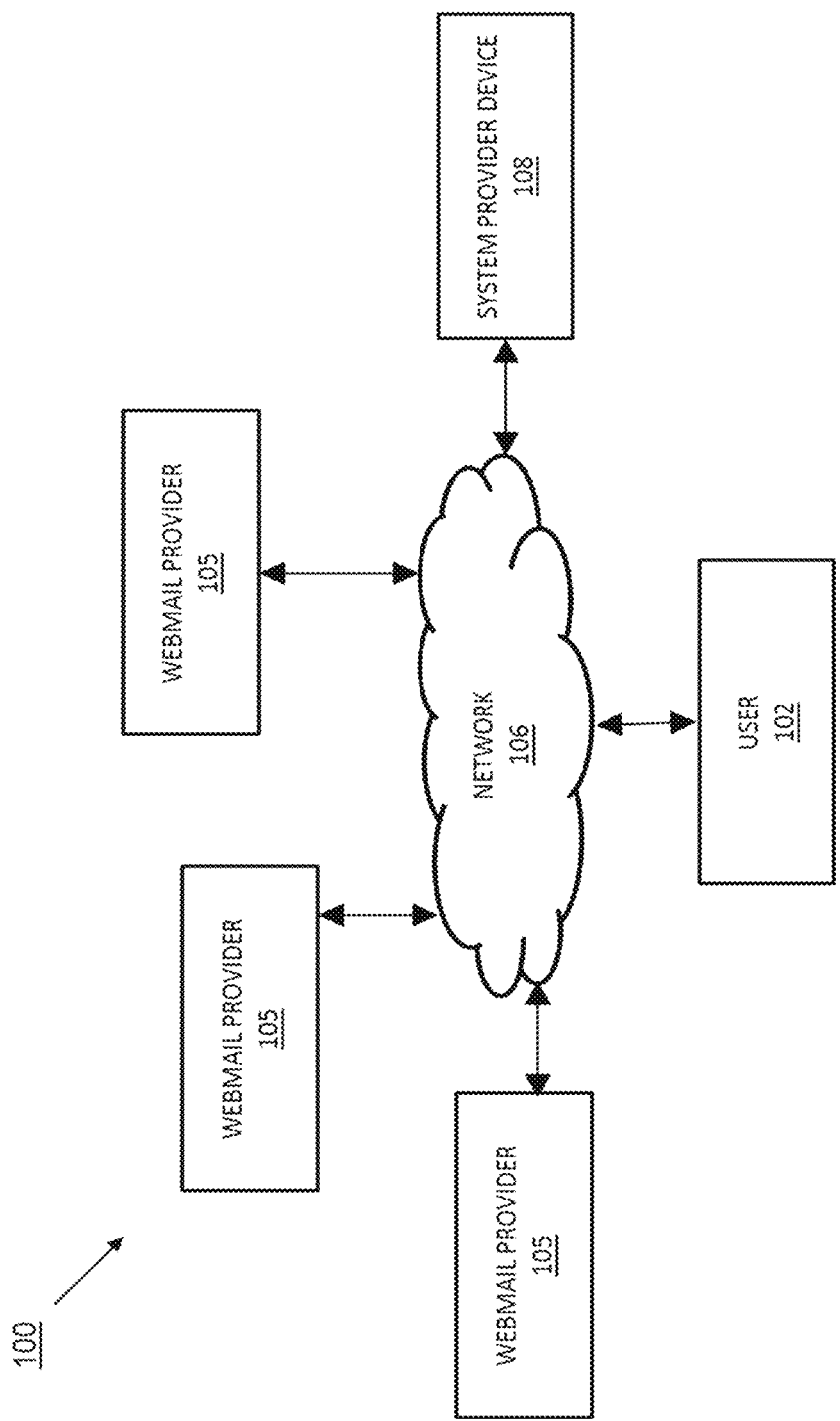
FIG. 1 is a schematic view illustrating an embodiment of a file management system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a file management system including an online document storage system that leverages webmail-provided storage to provide the online document storage system. Additionally, embodiments described herein may be equally applicable to any type of user (e.g., individual, customer, merchant, or other type of user) operating any type of computing device such as a laptop, a desktop, a mobile device, or other appropriate computing device, and where the computing device is able to access the Internet (e.g., through an Internet connection). Additionally, in various embodiments, the computing device(s) described herein may execute a mobile application that provides for one or more aspects of the file management system discussed below.

Among other uses, individuals increasingly rely on electronic networks, such as the Internet, for file storage and access. Currently, there exists a number of different file hosting services, such as Dropbox, Inc. of San Francisco, Calif., that provide online file storage. Such file hosting services may provide online file storage, where the files stored online may be accessed via a service provider website (e.g., Dropbox website) or via a mobile application. Moreover, in various examples, file hosting services may provide a variety of different features including different amounts of limited free storage. Generally, file hosting services operate according to a "freemium" pricing model, where users are allocated limited free storage space (e.g., 2 GB for Dropbox) while having to pay for any additional storage space. As such, users may prefer to find alternate free online storage space rather than pay for additional storage. For example, in some cases, users may opt to create multiple accounts for a number of different file hosting services in order to take advantage of the free storage space offered by each file hosting service. However, this can add complexity and loss of time, for example, for a user trying to remember in which account a particular file was stored. Thus, users may be faced with having to inconveniently manage multiple file hosting service accounts or pay a premium for additional storage space with their file hosting service of choice.

By providing the file management system as described herein, a user is provided with an online document storage system that leverages webmail-provided storage to provide the online document storage system. For example, in accordance with embodiments described herein, a user may have any number of different webmail accounts such as a Gmail account provided by Google of Menlo Park, Calif., a Yahoo Mail account provided by Yahoo Inc. of Sunnyvale, Calif., and/or an AOL Mail account provided by AOL Inc. of New York, N.Y., among others. Each such webmail account provides each user with a mailbox having an allocated free mailbox storage size that can vary based on the webmail provider. For example, a Gmail account may provide mailbox storage of about 15 GB, a Yahoo Mail account may provide mailbox storage of about 1 TB, and an AOL Mail account may provide unlimited mailbox storage. While webmail providers may grant users with such sizeable free mailbox storage, in many cases these large mailboxes may go substantially un-utilized or under-utilized.

In various embodiments, the file management system disclosed herein may aggregate the free mailbox storage from any number of different webmail providers with which a user has an account, where such aggregated mailbox storage space may be used in a manner similar to a file hosting service (e.g., such as Dropbox). However, in embodiments disclosed herein, files may be saved as email attachments to what may be an otherwise blank draft email, thereby advantageously using previously un-utilized or under-utilized mailbox storage space. From a user's perspective (e.g., using a laptop, desktop, mobile device, or other user device) and in some embodiments, the user may interact with a familiar user interface (UI) including a file manager or file browser (e.g., providing window(s) having one or more files or folders included therein). Thus, a user may as usual copy a desired file or files into a designated folder on the user device. However, a storage and querying engine as shown and described in FIGS. 6A/6B, may take the desired file or files copied into the designated folder on a user device and attach the file to a blank draft email (e.g., of a user webmail account), thereby effectively saving the file into the aggregated mailbox storage space. In some embodiments, the storage and querying engine may likewise retrieve files which have been previously stored as mail attachments. Various other embodiments and advantages of the present disclosure will become evident in the discussion that follows and with reference to the accompanying figures.

Referring now to FIG. 1, an embodiment of a file management system 100 is illustrated. The file management system 100 includes a user 102. In various embodiments, the user 102 may include any type of user (e.g., individual, customer, merchant, or other type of user) operating any type of computing device such as a laptop, a desktop, a mobile device, or other appropriate computing device. While the embodiments herein are generally shown and described with reference to a single user (e.g., user 102) for the sake of clarity, it will be understood that various embodiments may include a plurality of users at a plurality of user physical locations. In various examples, the user 102 includes, corresponds to, or is associated with one or more user devices (e.g., such as the computing devices described above) that are coupled to a network 106 that is further coupled to a system provider device 108. For example, the user 102 and the system provider device 108 are configured to communicate with one another by way of the network 106, for example by way of network communication devices, as discussed below.

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the user 102 may communicate through the network 106 via cellular communication, by way of one or more user network communication devices. In other examples, the user 102 may communicate through the network 106 via wireless communication (e.g., via a WiFi network), by way of one or more user network communication devices. In yet other examples, the user 102 may communicate through the network 106 via any of a plurality of other radio and/or telecommunications protocols, by way of one or more user network communication devices. In still other embodiments, the user 102 may communicate through the network 106 using a Short Message Service (SMS)-based text message, by way of one or more user network communication devices.

The system provider device 108 may likewise couple to the network 106 via a wired or wireless connection. As described in more detail below with reference to FIG. 14, the system provider device 108 may include a storage and querying engine, a communication engine, a user database, and a webmail provider database. Software or instructions stored on a computer-readable medium, and executed by one or more processors of the system provider device 108, allows the system provider device 108 to send and receive information over the network 106. Furthermore, the storage and querying engine in the system provider device 108 may be configured to implement the various embodiments of the file management system as described herein. In some examples, the system provider device 108 is configured to receive a request (e.g., from a user) to create a file management account. In some embodiments, as part of the creation of the file management account and based on determination of one or more user attributes such as webmail account types (e.g., Gmail, Yahoo Mail, AOL Mail, etc.), webmail account authentication information (e.g., user name and password information), aggregate mailbox settings, and/or other user attributes, as described herein, the system provider device 108 may suggest an initial aggregate mailbox configuration. For example, in some cases, the aggregate mailbox may be configured to equally utilize mailbox storage space equally across all webmail accounts that the user has selected during the file management account creation process. Alternatively, in various embodiments, the aggregate mailbox may be configured to preferentially utilize mailbox storage for a particular user webmail account that has the most free space. Various other aggregate mailbox configuration settings may similarly be used, without departing from the scope of the present disclosure. In some examples, whether or not the system provider device 108 suggests an initial aggregate mailbox configuration, the user may manually select a desired aggregate mailbox configuration. As described in more detail below, the system provider device 108 is also configured to save and retrieve files, according to various aspects of the present disclosure.

As illustrated in FIG. 1, one or more webmail providers 105 may likewise couple to the network 106 via a wired or wireless connection. As described above, the webmail providers 105 may include email service providers such as Gmail, Yahoo Mail, AOL Mail, and/or other webmail providers as known in the art. As such, the webmail providers 105 may communicate data (e.g., mailbox usage, authentication information, metadata, file attachments, or other webmail-available data) to the system provider device 108.

In addition, in some embodiments, the system provider may include a payment service provider such as, for example, PayPal Inc. of San Jose, Calif., that provides the file management system 100 for the user 102, as well as any other users implementing the file management system 100. Information sent and received through the network 106, user devices, and webmail providers 105 may be associated with user 102 accounts in a database located in a non-transitory memory, and any use of that information may be stored in association with such user 102 accounts. Furthermore, the payment service provider may provide the file management system 100 for a plurality of different users, similarly as described for the user 102, discussed below. Thus, references to a system provider operating a system provider device below may refer to a payment service provider operating a payment service provider device, or may refer to any other entity providing a file management system separate from or in cooperation with a payment service provider.

Figure 2:
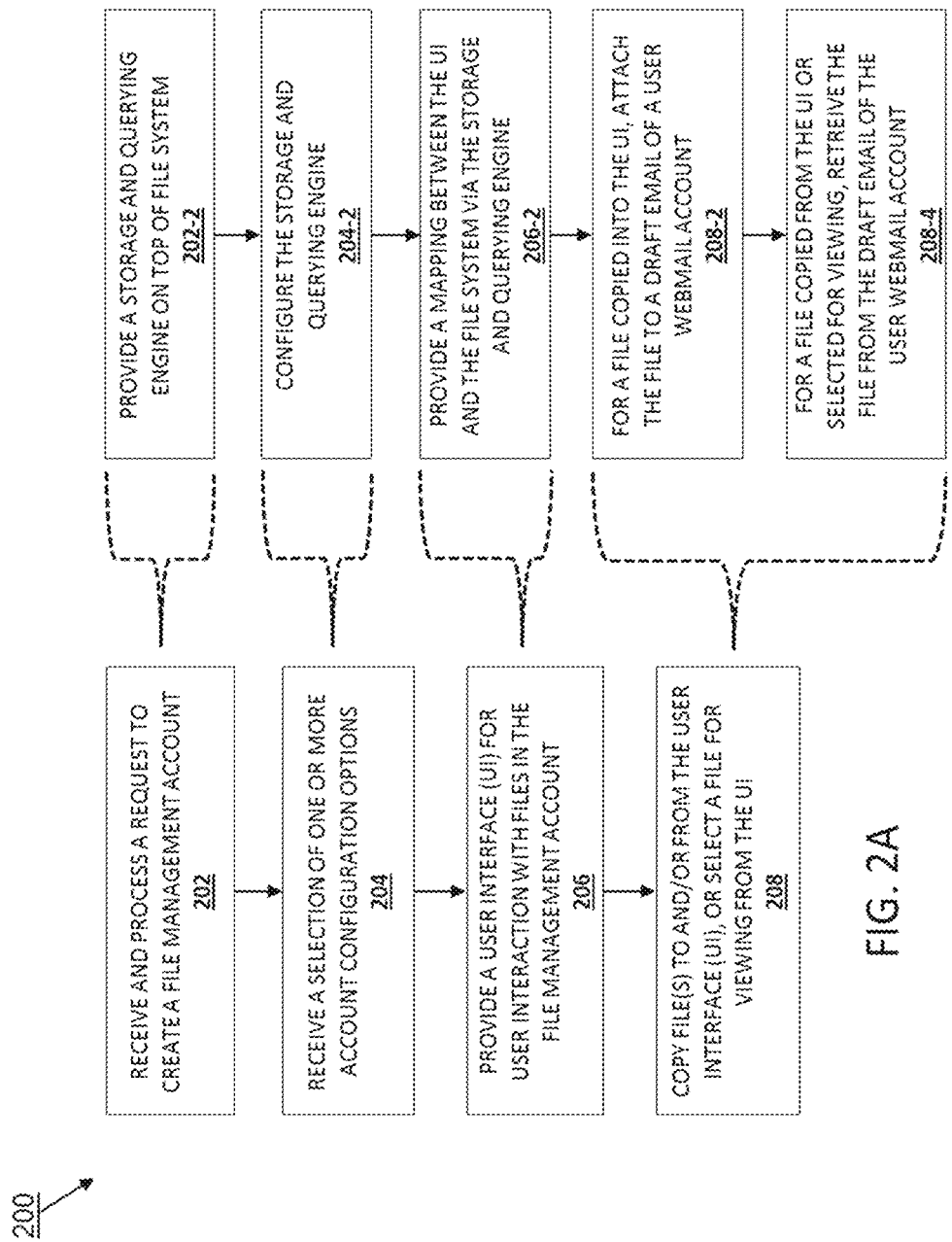
FIGS. 2a and 2b are flow charts illustrating an embodiment of a method for providing a file management system that leverages webmail-provided storage to provide online document storage.

Referring now to FIG. 2A/2B, an embodiment of a method 200 for providing a file management system that leverages webmail-provided storage to provide online document storage is illustrated. In some embodiments, steps in FIG. 2A of the method 200 include steps directly related to or involving a user of the file management system 100 (e.g., receiving a request, selection, or other input from a user, or providing/displaying something to the user). In some examples, steps in FIG. 2B of the method 200 include back-end steps, which while related to the steps shown in FIG. 2A, may not necessarily be visible to the user of the file management system 100. One of skill in the art in possession of the present disclosure will recognize that the method 200 may be performed for a plurality of different users at a variety of physical locations. It will also be understood that additional steps may be performed before, during, and/or after the steps described below with reference to the method 200. In particular, with reference to FIGS. 3-5, 6A/6B, and 7-10, various aspects of the method 200 are illustrated and described.

Figures 3, 4:
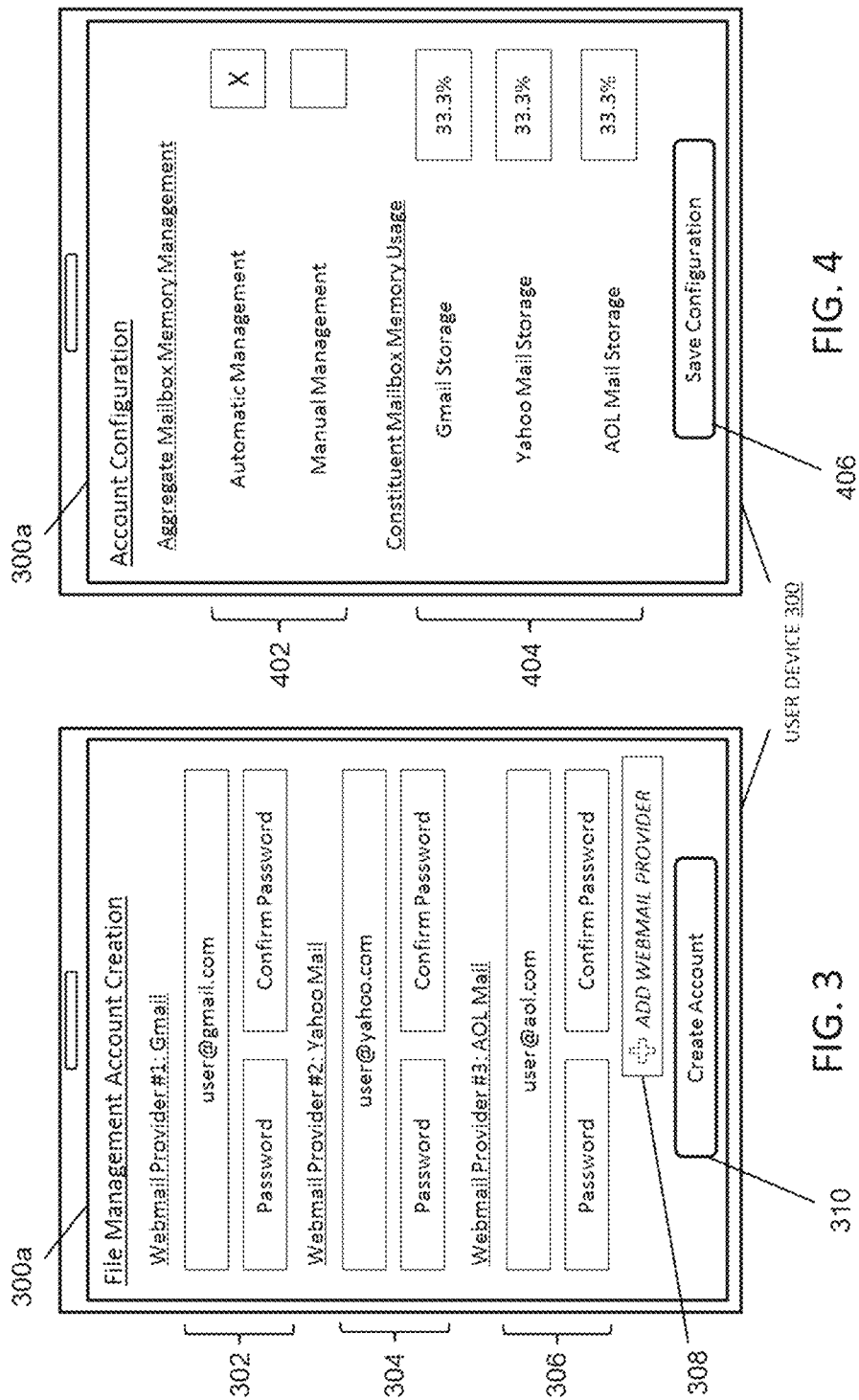
FIG. 3 illustrates an embodiment of a user device including a screen shot displaying an account creation screen.
FIG. 4 illustrates an embodiment of a user device including a screen shot displaying an account configuration screen.

The method 200 begins at block 202 where a request to create a file management account is received (e.g., from a user) and processed, thereby creating the file management account. Referring first to FIG. 3, a user device 300 is illustrated that includes a display 300a and which may include a touchscreen user interface. The user device 300, in accordance with various embodiments of the present disclosure, may include a laptop computer, a desktop computer, a mobile phone, a tablet, and/or any of a variety of other type of computing device as known in the art. In various embodiments, a user associated with the user device 300 may launch a system provider application and/or a payment service provider application (e.g., a payment application provided by PayPal, Inc. of San Jose, Calif.), for example, to request creation of the file management account and/or to update, view, or otherwise interact with a previously created file management account.

Consider, for example, a user that would like to create a new file management account. In some embodiments, with reference to FIG. 3 and in an embodiment of block 202, upon launching the system provider application, the user may be presented with a "File Management Account Creation" screen, as shown in the display 300a. In various examples, a user may be prompted to enter authentication information 302, 304, 306 (e.g., email address or user name, and password), for each webmail account which the user would like to include in the file management account. It should be noted that while the example of FIG. 3 illustrates three webmail provider accounts (e.g., Gmail, Yahoo Mail, and AOL Mail), in some cases, the file management account described herein may be created with less or more webmail provider accounts. As also shown in FIG. 3, an "Add Webmail Provider" button 308 may be provided to allow the user to add additional webmail provider accounts. After entering the authentication information 302, 304, 306, the user may select a "Create Account" button 310. Upon selecting the "Create Account" button 310, the request to create the file management account, together with the authentication information for each webmail account entered by the user, may be provided to the system provider, and the system provider may use the information to thereby create the file management account. In some examples, the authentication information 302, 304, 306, may be provided during account creation, as described above, after which the system provider may continue to have on-going access to each of the webmail accounts until such access is revoked by the user.

Figure 6A:
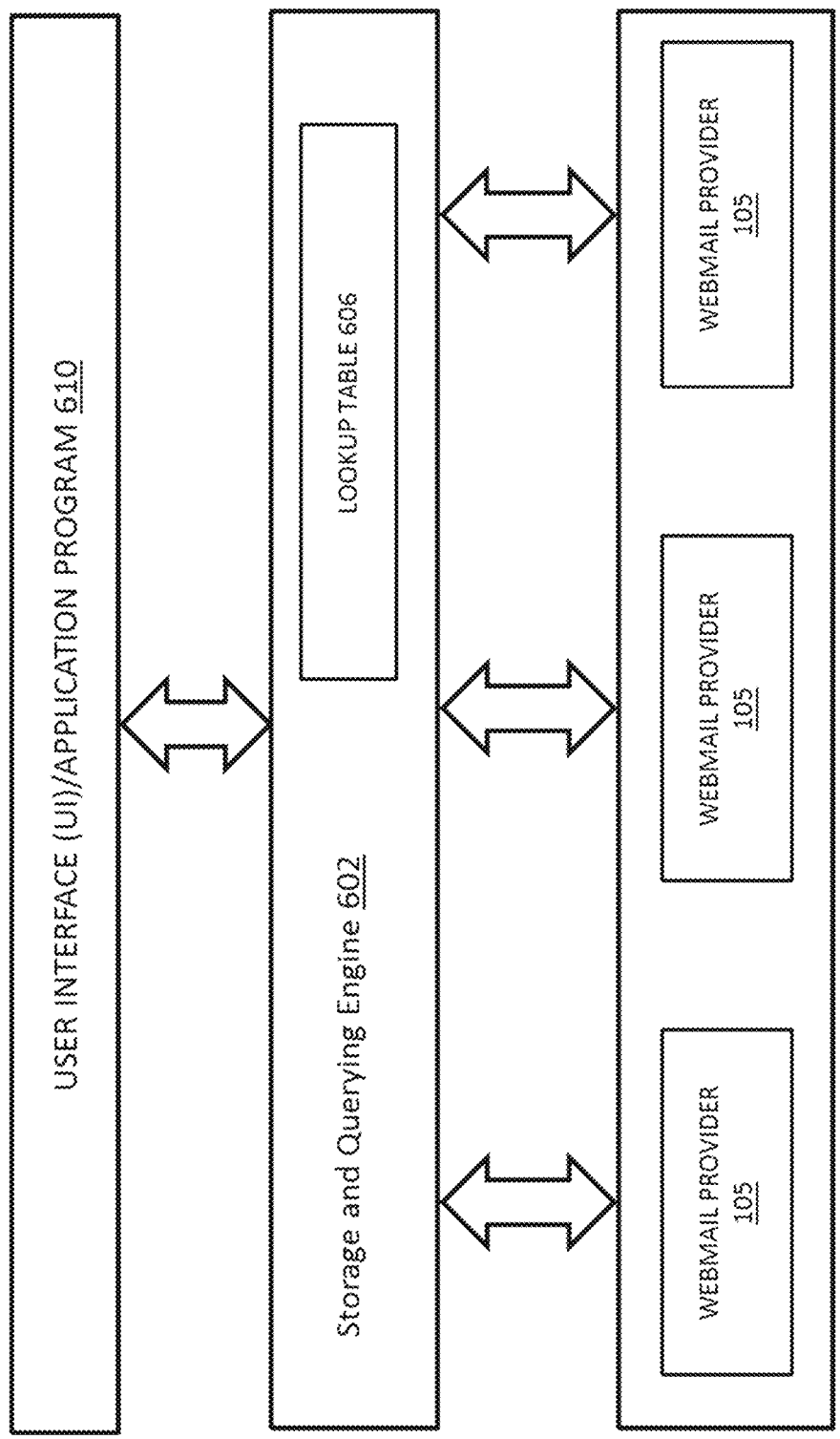
FIG. 6A illustrates a storage and querying engine (SQE) which mediates file storage and retrieval between a UI and one or more webmail provider accounts.

It is noted that creation of the file management account of block 202 may further provide a storage and querying engine, as shown in related block 202-2 of the method 200. Referring to FIG. 6A, and in an embodiment of block 202-2, illustrated therein is a storage and querying engine (SQE) 602 which mediates file storage and retrieval between a requesting user (e.g., via a user interface (UI)/application program 610) and the one or more webmail provider accounts 105. By way of illustration, and in some embodiments, the SQE 602 may be substantially the same as, and in some cases may be referred to as a database management system (DBMS), where the SQE 602 provides a layer of abstraction on top of the underlying file system (e.g., webmail file system) which may include the free file storage from each of the webmail provider 105 accounts included in the creation of the file management account, as described above. In various embodiments, file storage and/or retrieval by the SQE 602 may be implemented in part by way of one or more data structures including arrays, lists, trees, heaps, hashes, graphs, stacks, queues, buffers, or other data structures as known in the art. By way of example, the SQE 602 may include a lookup table data structure 606 that serves to facilitate storage and retrieval of data/files between the UI 610 and the underlying file system (e.g., webmail storage), as described in more detail below. Moreover, in various examples, queries of the underlying file system may be handled, for example, by a structured query language (SQL) client deployed on top of the SQE 602. In some cases, such a SQL client may serve as an interface between a user interface (UI) application and the SQE 602. Thus, following blocks 202, 202-2 the system provider device has received and processed a request to create the file management account using the authentication information for each webmail account submitted by the user.

Figure 6B:
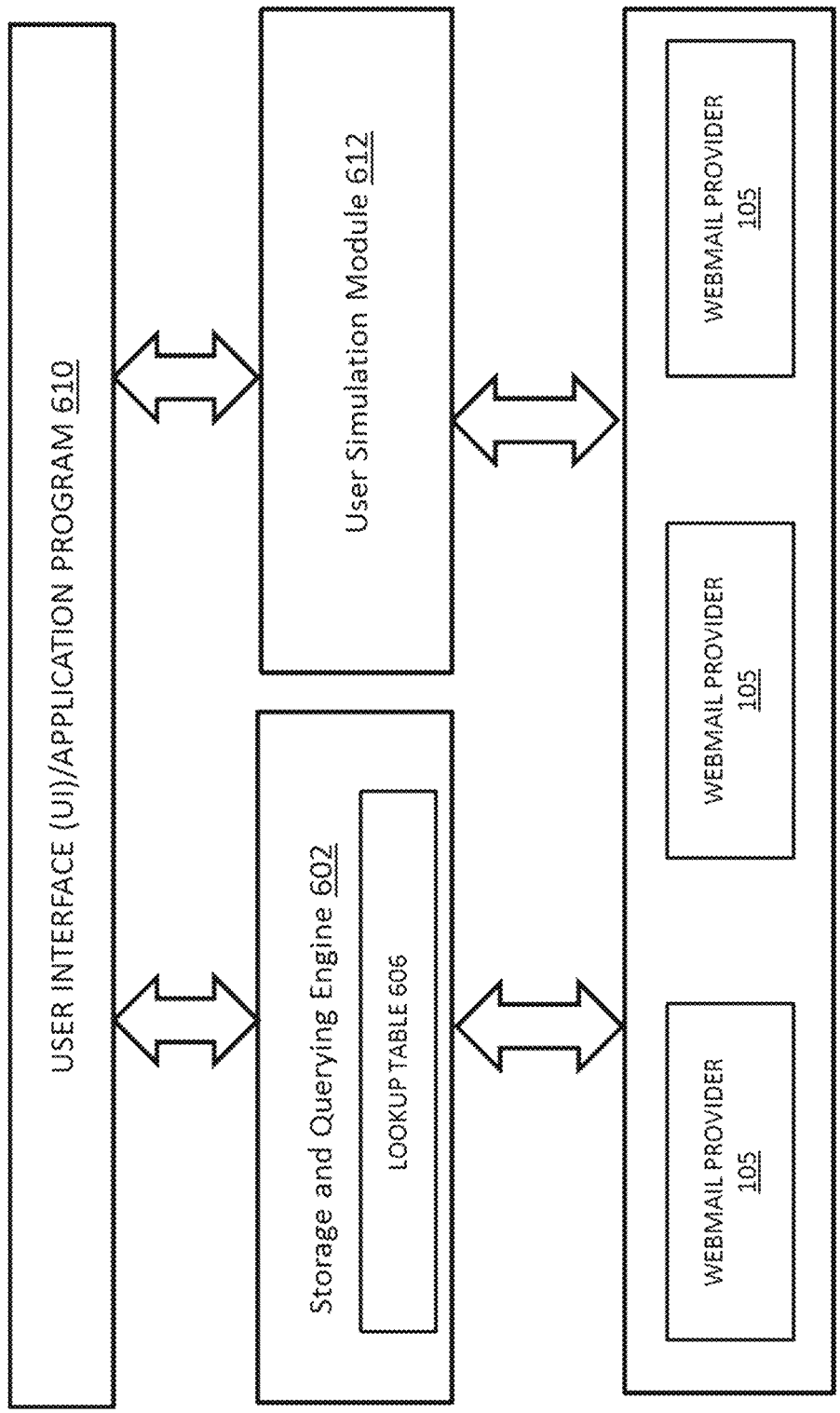

Referring to FIG. 6B, and in some embodiments, a user simulation module 612 layer may optionally be inserted between the UI 610 and the webmail providers 105, thereby mediating communication there between. In particular, the user simulation module 612 may operate to resolve challenges presented by one or more of the underlying webmail providers 105. As used herein, the term "challenges" may refer to scripts or other similar functionality, that may be deployed by one or more of the webmail providers 105 (e.g., Gmail, Yahoo Mail, AOL Mail), and which may be used as challenge-response tests to determine whether a particular webmail account is being accessed by a robot or a human user. In addition, in some embodiments, the user simulation module 612 includes a script that serves to mimic a human user and which in some cases may prompt a human user for an input, or which may automatically provide input, for example, to the webmail providers 105, without human user input. In various embodiments, and depending on the complexity or sophistication of the challenge deployed by the underlying webmail providers 105, the user simulation module 612 may respond in at least one of two ways. In some cases, for example for less complex or less sophisticated challenges (e.g., such as simple math calculations), the user simulation module 612 may resolve the challenge on its own (e.g., providing the requested feedback to the webmail provider 105), in a manner that is substantially invisible to the user. Alternatively, for more complex or more sophisticated challenges (e.g., such as a CAPTCHA challenge-response test), the user simulation module 612 may be unable to resolve the challenge on its own, and instead the user simulation module 612 may thus instead operate as a conduit that passes the challenge on to the human user (e.g., by prompting a user for input by way of the UI 610). Thereafter, the user simulation module 612 may receive or otherwise capture the human user input and provide such input to the underlying webmail provider 105, thereby resolving the challenge. Generally, the user simulation module 612 may be used to spoof a human user and resolve a variety of challenge-response test types, such that interaction between the UI 610 and the webmail providers 105 proceeds seamlessly. While some examples of using the user simulation module 612 to mimic a human user and resolve challenge-response tests have been provided, those skilled in the art in possession of the present disclosure will recognize other implementations of the user simulation module 612, while remaining within the scope of the present disclosure.

The method 200 proceeds to block 204 a selection of one or more account configuration options are received. With reference to the example of FIG. 4, an embodiment of block 204 is illustrated. In some embodiments, after selection of the create account button 310 (FIG. 3), the system provider application may next present the user with an "Account Configuration" screen, as shown in the display 300a of FIG. 4. By way of example, the user may be prompted to enter/select a memory management option 402, as well as a constituent mailbox memory usage 404, for the file management system 100 aggregate mailbox memory which includes the free mailbox storage from the three webmail provider accounts which the user previously entered in the "File Management Account Creation" screen of FIG. 3. As shown in FIG. 4, in some embodiments, the memory management option 402 may include an "Automatic Management" option and a "Manual Management" option. In some embodiments, when the "Automatic Management" option is selected and as shown in FIG. 4, the system provider may assign equal mailbox storage usage for each constituent webmail account that is part of the file management system 100. Thus, in the present example which includes three webmail accounts, selection of the "Automatic Management" option may result in setting the constituent mailbox memory usage 404 to 33.3% for each of the three webmail accounts (e.g., Gmail, Yahoo Mail, and AOL Mail). It is noted that as used herein, the value of the constituent mailbox memory usage 404 may be used by the system provider to determine into which constituent webmail mailbox a particular user file should be saved (e.g., by attaching the user file to a blank draft email within the appropriate webmail account). By way of illustration, if the file management system instead includes two webmail accounts and the "Automatic Management" option was selected, the system provider may set the constituent mailbox memory usage to 50% for each of the two webmail accounts. Thus generally, the "Automatic Management" option provides for substantially equal distribution of the constituent mailbox memory usage, by equally using the mailbox storage for each of the constituent webmail accounts that make up the file management system.

In alternative embodiments, the "Manual Management" option may be selected, and the user may manually assign desired constituent mailbox memory usage 404 values. In various cases, selection of the "Manual Management" option provides for fully customizable constituent mailbox memory usage 404 values. For example, a user may assign equal constituent mailbox memory usage 404 values to each of the constituent webmail mailboxes, as in the "Automatic Management" example, or the user may assign different values to each of the constituent webmail mailboxes. In some cases, the user may even set the constituent mailbox memory usage 404 value to 0% for one or more of the constituent webmail mailboxes, thereby ensuring that the file management system does not save user files into that particular webmail mailbox having a constituent mailbox memory usage 404 value set to 0%. While some examples of information included in the "Account Configuration" screen have been provided, those skilled in the art in possession of the present disclosure will recognize other types of information and/or settings that may be available for user configuration by way of the "Account Configuration" screen, while remaining within the scope of the present disclosure. After entering the account configuration options, the user may select a "Save Configuration" button 406. It is noted that entering the account configuration options in block 204 may further configure the storage and querying engine 602, as shown in related block 204-2 of the method 200. Thus, following block 204, the system provider device has received a selection of one or more account configuration options. Additionally, in some embodiments, block 204 may be skipped (e.g., after initial creation of the file management account at block 202), and instead the "Account Configuration" screen may be called up at a later time by a user interacting with the file management system 100.

Figure 5:
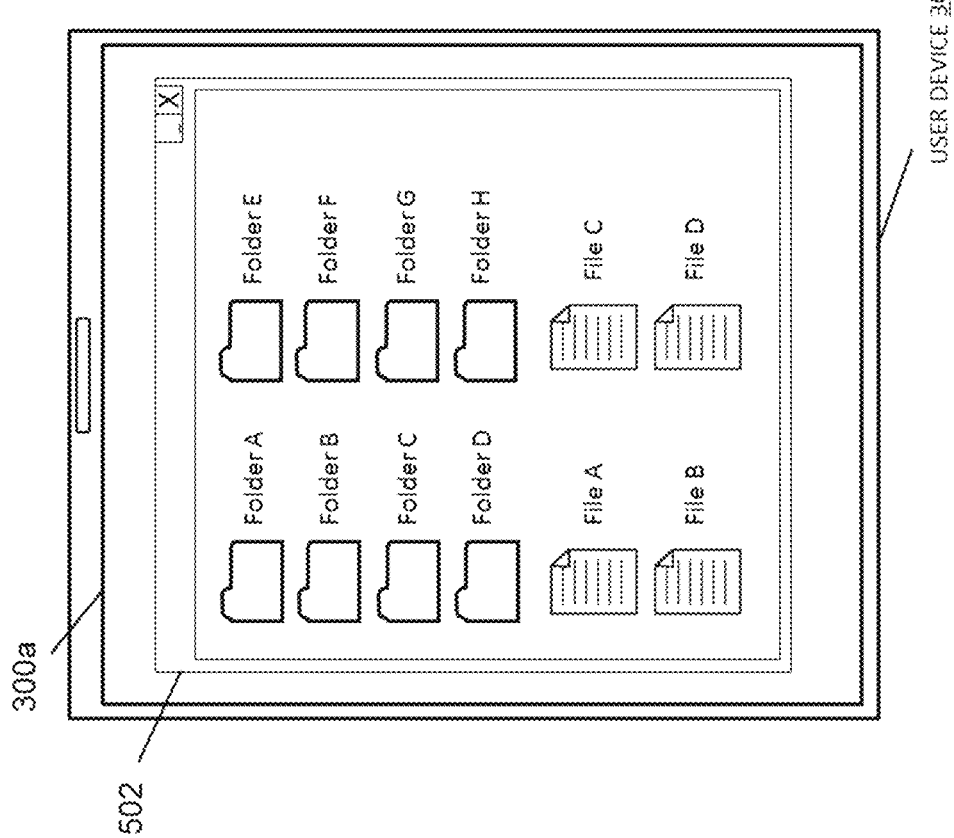
FIG. 5 illustrates an embodiment of a user interface (UI) for user interaction with the file management account.
Figure 7:
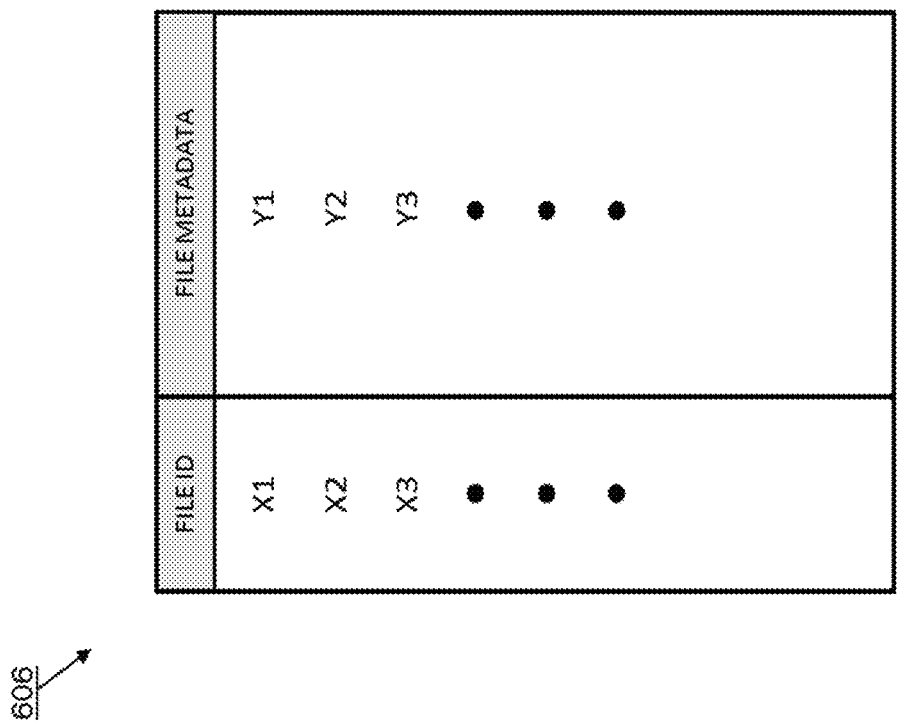
FIG. 7 is an illustrative view of a lookup table, in accordance with some embodiments.

The method 200 proceeds to block 206 where a user interface (UI) is provided for user interaction with the file management account. With reference to the example of FIG. 5, an embodiment of block 206 is illustrated. In some embodiments, the provided UI includes a file manager or file browser 502, as shown in the display 300a of the user device 300. In some embodiments, the UI 610 of FIG. 6A may similarly include the file browser 502 UI. As shown in FIG. 5, the file browser 502 may include a window that allows a user to access files and/or folders included therein (e.g., such as Folders A-H and Files A-D). Moreover, the files and/or folders included within the file browser 502 may be stored within webmail storage (e.g., as attachments to blank email messages), as mediated by the SQE 602. It is noted that providing the UI in block 206, which may include one or more files and/or folders, may further provide a mapping between the UI 502/610 and webmail provider 105 storage, as shown in related block 206-2 of the method 200. In some embodiments, such a mapping is provided by the lookup table 606 (FIG. 6A), illustrated in more detail with reference to FIG. 7. As shown in FIG. 7, the lookup table 606 may include a first column denoted as 'File ID' and a second column denoted as 'File Metadata'. In some embodiments, the 'File ID' may refer to an identifier assigned, for example by the system provider, to a particular file (e.g., such as File A, File B, File C, or File D, shown in FIG. 5). In some examples, the 'File Metadata' may include data used to identify a particular draft email, within a particular webmail account, to which the file having the corresponding 'File ID' has been attached. Thus, in various embodiments, the 'File Metadata' may include data entries within an email subject line, within an email body, and/or within an email header, among others. Additional details of applications of the lookup table 606 are described in more detail below with reference to block 208 and 208-4 of the method 200.

The method 200 proceeds to block 208 where a file is copied to/from the user interface (UI) or selected for viewing (i.e., file is opened). With reference to the example of FIGS. 5, 6A, 6B, 7, 8, and 9, an embodiment of block 208 is illustrated. It is noted that embodiments of block 208 may further attach a file to a draft email of a user webmail account (e.g., for a file copied to the UI), as shown in related block 208-2 of the method 200. Also, in some embodiments of block 208, a file may be retrieved from a draft email of a user webmail account (e.g., for a file copied from the UI or selected for viewing/opened), as shown in related block 208-4 of the method 200.

Figure 8:
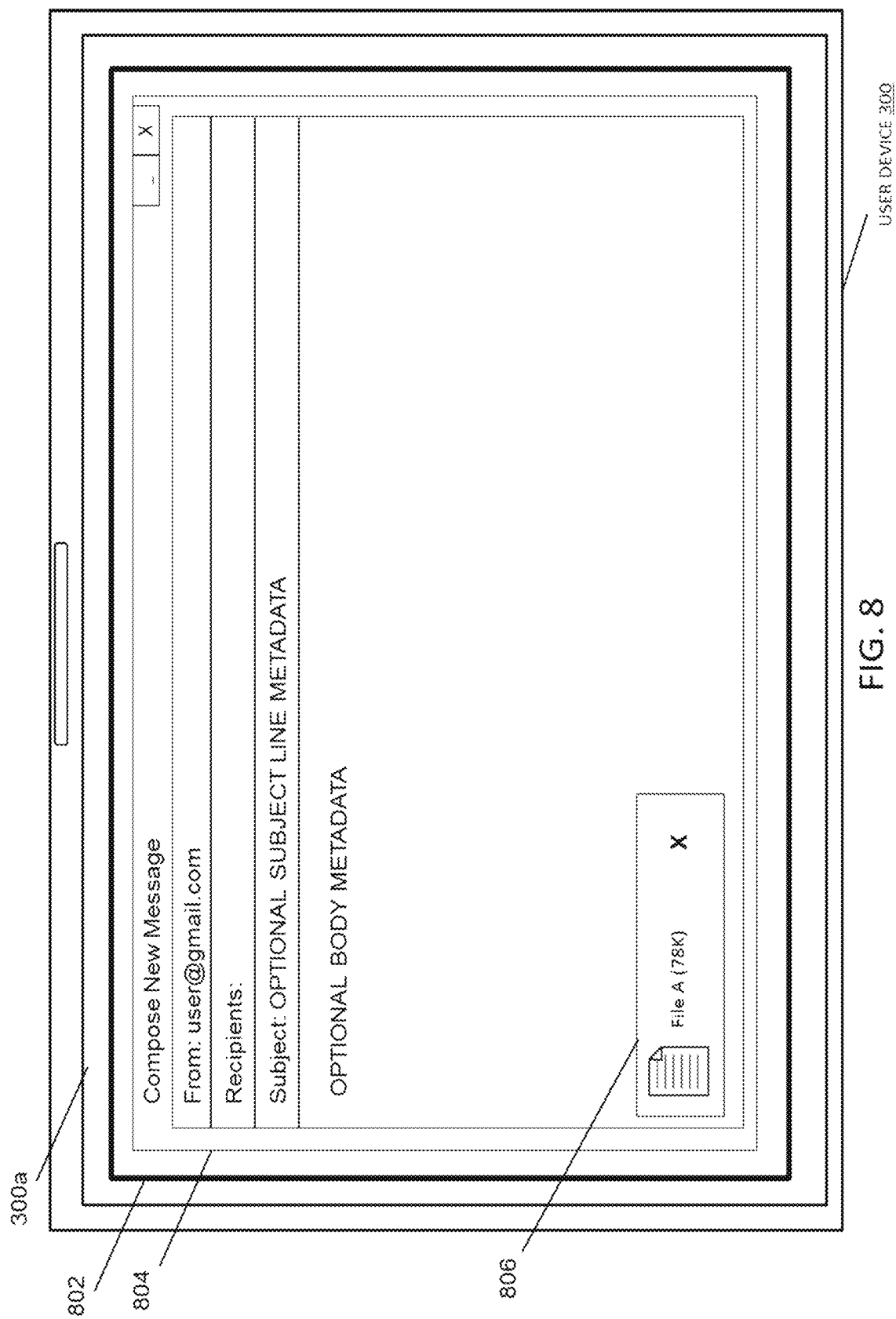
FIG. 8 illustrates a webmail interface including a blank, draft email having an attached file, in accordance with some embodiments.
Figure 9:
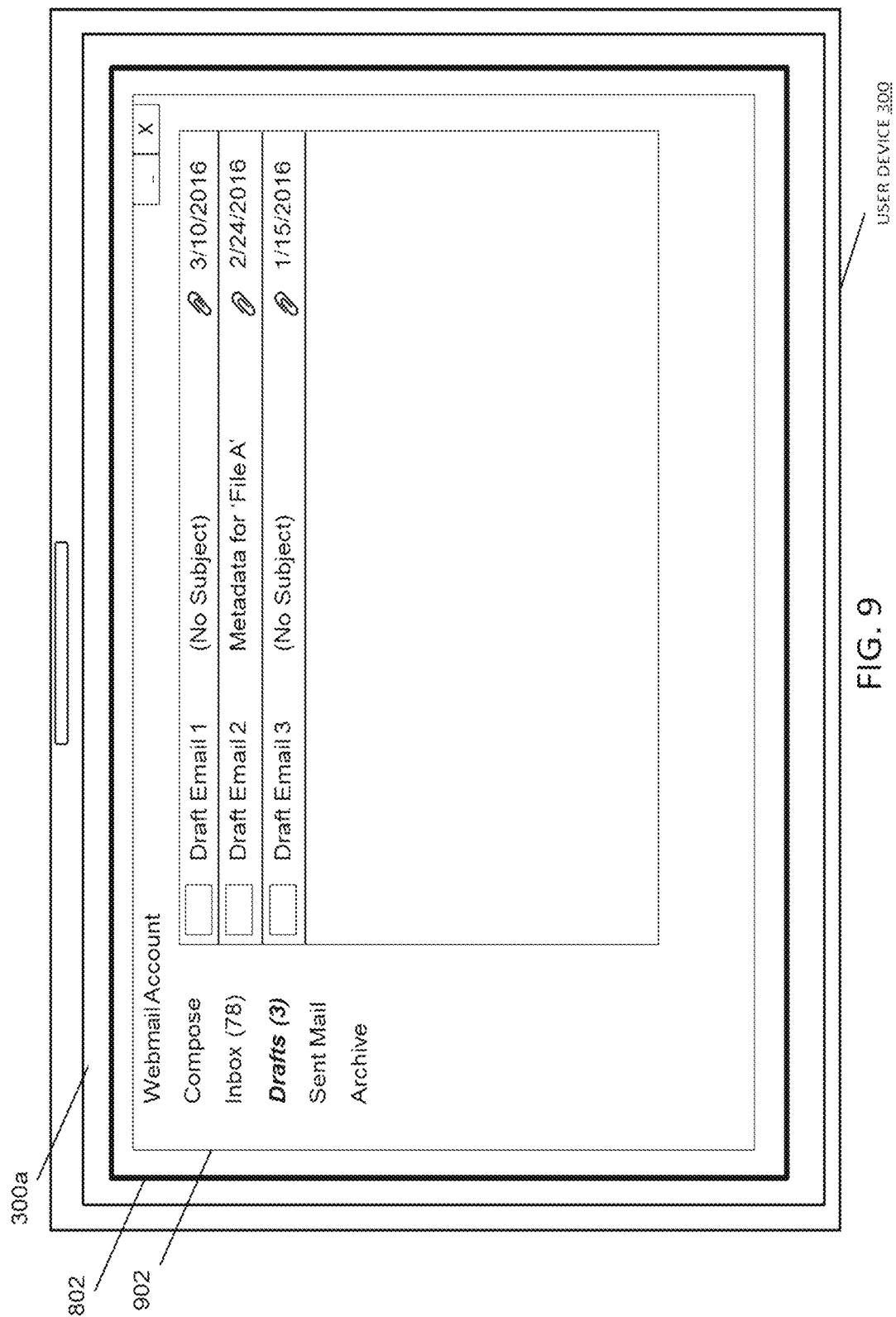
FIG. 9 illustrates a webmail interface including a view of a 'Drafts' email folder, in accordance with some embodiments.

Consider first the example where a file, such as 'File A' of FIG. 5, is copied to the file browser 502, or equivalently to the UI 610. From a user's perspective, copying a file into the UI 610 or browser 502 may appear to happen seamlessly, with the copied file substantially immediately appearing in the destination window/folder (e.g., such as the browser 502) to which it has been copied. In actuality, however, the system provider may perform a plurality of steps to save the file (e.g., 'File A') to a draft email of a user's webmail account. For example, recall that the SQE 602 is attached/interfaced on one side to the UI 610 (e.g., which may likewise include the browser 502), and the SQE 602 is attached/interfaced on the other side to each of the webmail providers 105 which were included in the formation of the file management account 100 (e.g., Gmail, Yahoo Mail, AOL Mail). For the example of copying the file 'File A' to the file browser 502 (or the UI 610), the system provider may attach the file to a draft email. With reference to FIG. 8, illustrated therein is a webmail interface 802 including a new blank, draft email 804 opened by the system provider, for one of the webmail providers 105 (e.g., Gmail), where the system provider has attached the file 'File A' to the draft email 804, as shown by email attachment 806. In various embodiments, optional subject line metadata, body metadata, and/or header metadata may be added to the draft email 804, for example, for use by the lookup table 606 for later retrieval of the file 'File A'. Referring to FIG. 9, illustrated therein is the webmail interface 802 including a view 902 of a 'Drafts' email folder for the webmail account into which the system provider has attached the file to the draft email 804. In some embodiments, 'Draft Email 2' is the draft email 804 into which the file 'File A' was attached by the system provider, and the 'Draft Email 2' includes subject line metadata, as shown in FIG. 9. Additionally, as also shown in FIG. 9, other draft emails (e.g., 'Draft Email 1' and 'Draft Email 3') may also correspond to files copied to the file browser 502, or equivalently to the UI 610. However, in the present example, 'Draft Email 1' and 'Draft Email 3' may not include subject line metadata. As discussed above, attaching the file 'File A' to the draft email 804 may be entirely a back-end process (e.g., substantially invisible to a user), and which is handled by the SQE 602 that mediates communication between the UI 610 and the webmail providers 105. Thus, in accordance with embodiments disclosed herein, the file 'File A' copied to the file browser 502 (or the UI 610) is effectively copied to mailbox storage space of the webmail account (e.g., Gmail, Yahoo Mail, AOL Mail) into which the system provider has attached the file 'File A' to the draft email 804.

Next consider the example where a file, such as the 'File A' of FIG. 5, is copied from the file browser 502 (or the UI 610) or selected for viewing (i.e., file is opened). From the user's perspective, copying the file from the UI 610 or browser 502, or opening the file, may appear to happen seamlessly, similar to the above discussion. In actuality, however, the system provider may perform a plurality of steps to copy/view the file (e.g., 'File A'). For example, copying and/or opening the file 'File A' from the file browser 502 (or the UI 610) may result in retrieval, by the system provider, of the file 'File A' from the draft email (e.g., draft email 804) of a user's webmail account to which the file was previously attached. As discussed above, retrieval of the file 'File A' may be accomplished, at least in part, by use of the lookup table 606 and a client/application that initiates a query (e.g., a SQL client, UI), which may employ subject line metadata, body metadata, and/or header metadata included in the draft email 804, to identify the draft email (e.g., 'Draft Email 2') to which the file 'File A' was previously attached, and thereby facilitate retrieval of the file 'File A'. Similar to the above discussion, retrieval of the file 'File A' from the draft email 804 may be entirely a back-end process (e.g., substantially invisible to a user), handled by the SQE 602. Thus, in accordance with embodiments disclosed herein, the file 'File A' retrieved from the file browser 502 (or the UI 610) is effectively retrieved from the mailbox storage space of the webmail account (e.g., Gmail, Yahoo Mail, AOL Mail) into which the system provider previously attached the file 'File A' to the draft email 804.

Figure 10:
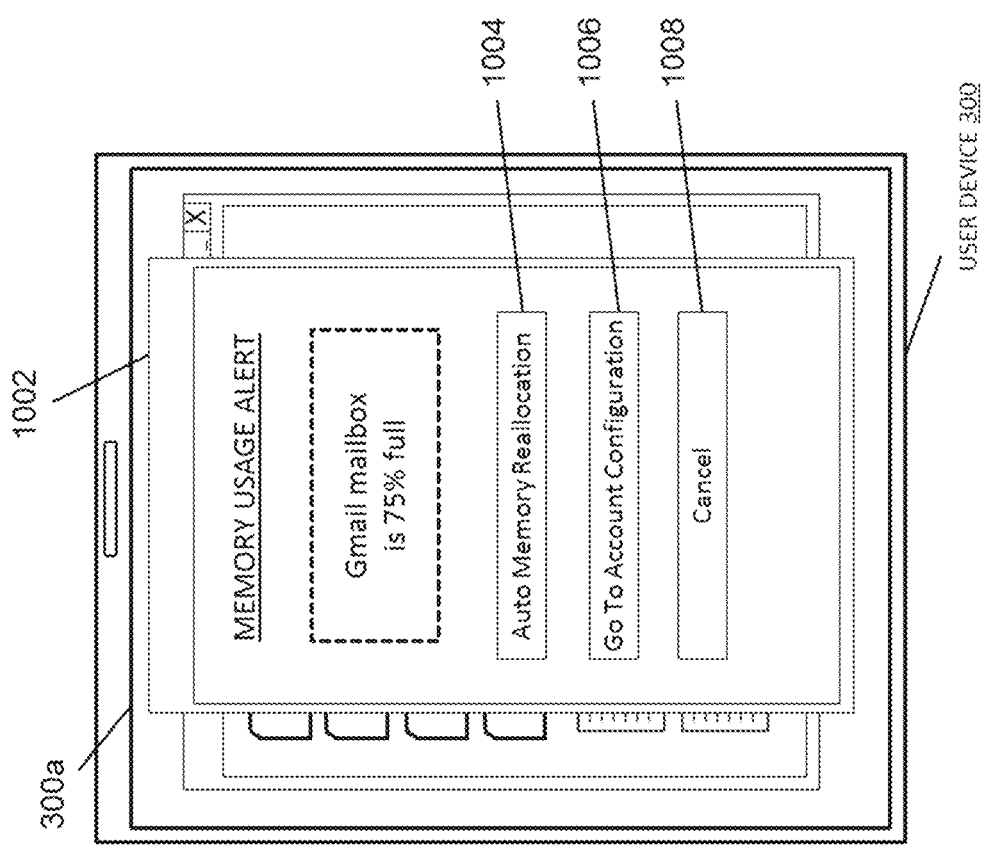
FIG. 10 illustrates an embodiment of a user device including a screen shot displaying a memory usage alert.

It will be understood that the examples given above, for example with reference to the method 200, are merely exemplary and are not meant be limiting in any way. Moreover, those of skill in the art in possession of this disclosure will recognize that various additional embodiments may be implemented in accordance with the methods described herein, while remaining within the scope of the present disclosure. For example, in various embodiments, after a period of time (e.g., minutes, hours, days, etc.), the system provider (e.g., by way of the system provider application) may determine that a mailbox of one or more of a user's webmail accounts may have reached or exceeded a predetermined memory usage threshold. With reference to FIG. 10, the system provider may present the user with a "Memory Usage Alert" 1002, which in the present example notifies the user that their "Gmail mailbox is 75% full". In some embodiments, the presented alert 1002 may include a variety of options such as "Auto Memory Reallocation" 1004, "Go To Account Configuration" 1006, or "Cancel" 1008. In some embodiments, if the user selects the auto reallocation option 1004, the system provider may automatically re-allocate the constituent mailbox memory usage 404 (FIG. 4) for each of the three webmail accounts (e.g., Gmail, Yahoo Mail, and AOL Mail) to adequately address the alert 1002. For example, since in this example the Gmail mailbox usage is high, the system provider may set the Gmail Storage constituent mailbox memory usage 404 to a low value or to 0%. In some cases, if the user selects the go to account configuration option 1006, the system provider may open the "Account Configuration" screen (FIG. 4), thereby allowing the user to manually re-allocate the constituent mailbox memory usage 404 for each of the three webmail accounts (e.g., Gmail, Yahoo Mail, and AOL Mail). In some embodiments, if the user selects the cancel option 1008, the alert 1002 may be ignored and the system provider may continue to operate the file management system 100 in the same manner in which it was operating before the alert 1002 was presented.

Thus, systems and methods have been described that provide for a file management system that provides a user with an online document storage system that leverages webmail-provided storage to provide the online document storage system. In various embodiments, the file management system disclosed herein aggregates the free mailbox storage from any number of different webmail providers with which a user has an account, where such aggregated mailbox storage space may be used in a manner similar to a file hosting service. However, in embodiments disclosed herein, files may be saved as email attachments to what may be an otherwise blank draft email, thereby advantageously using previously un-utilized or under-utilized mailbox storage space. In various examples and from a user's perspective, the file management system disclosed herein behaves in the same way as a traditional folder structure. However, any number of a plurality of back-end processes, which are invisible to the user, may be implemented (e.g., by the system provider and a storage and querying engine) in order to accomplish file storage/retrieval to/from the free mailbox storage of webmail provider accounts which a user has used to set-up the file management system. Various examples of technological devices and systems that may be used to implement embodiments of the present disclosure are discussed in more detail below with reference to FIGS. 11-14.

Figure 11:
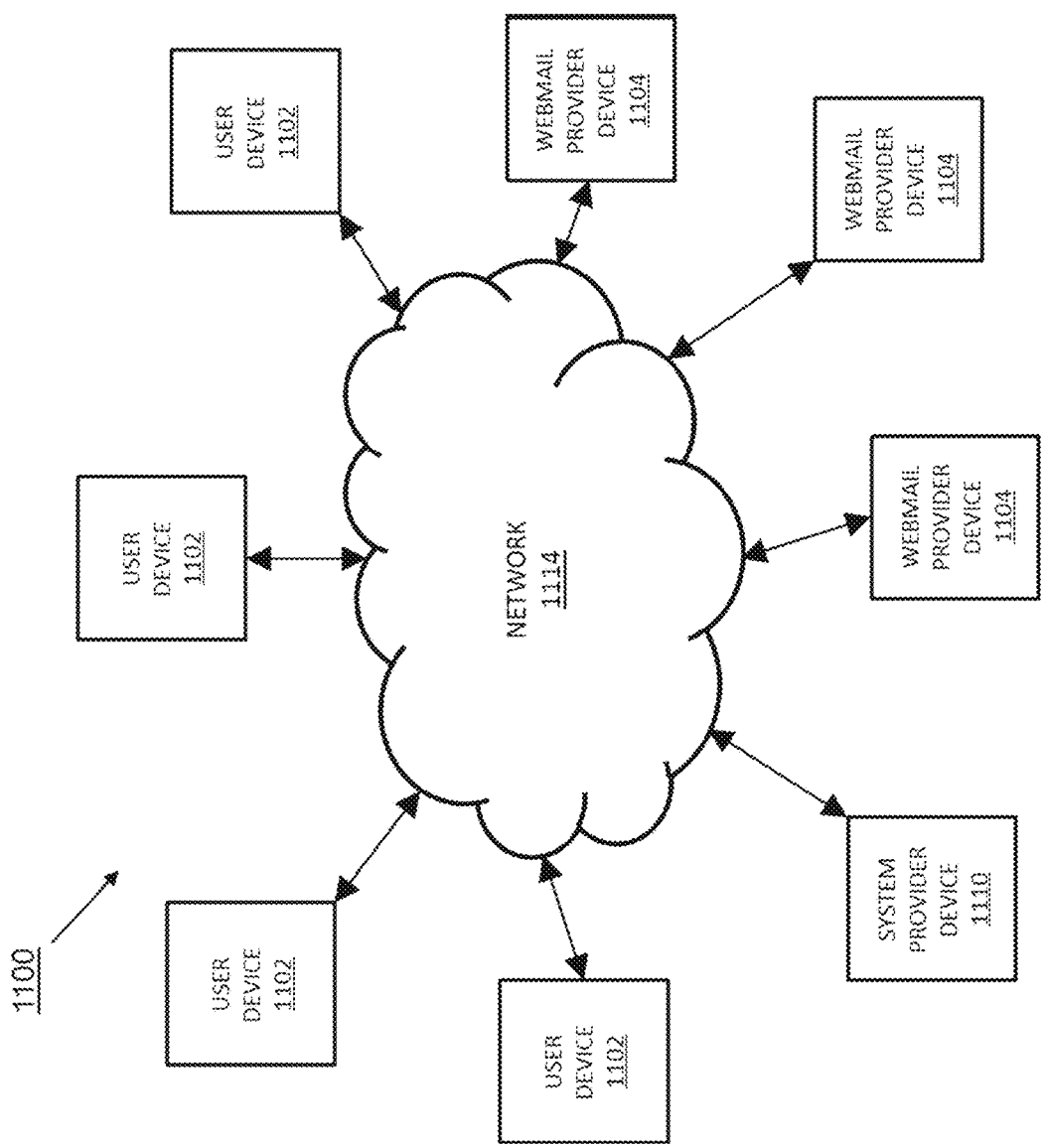
FIG. 11 is a schematic view illustrating an embodiment of a networked system.

Referring first to FIG. 11, an embodiment of a network-based system 1100 for implementing one or more processes described herein is illustrated. As shown, the network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1100 illustrated in FIG. 11 includes a plurality of user devices 1102, a plurality of webmail provider devices 1104, and/or a system provider device 1110 in communication over one or more networks 1114. The user devices 1102 may be the user devices discussed above and may be operated by the users discussed above. The webmail provider devices 1104 may be the webmail provider devices discussed above and may be operated by the webmail providers discussed above. The system provider devices 1110 may be the system provider devices discussed above and may be operated by the system providers discussed above, and in some cases may include a payment service provider device operated by a payment service provider such as, for example, PayPal Inc. of San Jose, Calif.

The user devices 1102, webmail provider devices 1104, and/or system provider device 1110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1114.

The network 1114 may be implemented as a single network or a combination of multiple networks. For example, in various embodiments, the network 1114 may include the Internet and/or one or more intranets, landline networks, wireless networks, and/or other appropriate types of networks.

The user devices 1102 and/or webmail provider devices 1104 may be implemented using any appropriate combination of hardware and/or software configured for wired and/or wireless communication over network 1114. For example, in one embodiment, the user devices 1102 and/or webmail provider devices 1104 may be implemented as a personal computer of a user in communication with the Internet. In other embodiments, the user devices 1102 and/or webmail provider devices 1104 may be a smart phone, wearable computing device, laptop computer, and/or other types of computing devices.

The user devices 1102 and/or webmail devices 1104 may include one or more browser applications which may be used, for example, to provide a convenient interface to permit the customer to browse information available over the network 1114. For example, in one embodiment, the browser application may be implemented as a web browser configured to view information available over the Internet.

The user devices 1102 and/or webmail provider devices 1104 may also include one or more toolbar applications which may be used, for example, to provide user-side processing for performing desired tasks in response to operations selected by the user. In one embodiment, the toolbar application may display a user interface in connection with the browser application.

The user devices 1102 and/or webmail provider devices 1104 may further include other applications as may be desired in particular embodiments to provide desired features to the user devices 1102 and/or webmail provider devices 1104. The other applications may also include security applications for implementing user-side security features, programmatic user applications for interfacing with appropriate application programming interfaces (APIs) over the network 1114, or other types of applications. Email and/or text applications may also be included, which allow a user to send and receive emails and/or text messages through the network 1114. The user devices 1102 and/or webmail provider devices 1104 may include one or more user and/or device identifiers which may be implemented, for example, as operating system registry entries, cookies associated with the browser application, identifiers associated with hardware of the user devices 1102 and/or webmail provider devices 1104, or other appropriate identifiers, such as a phone number. In one embodiment, the user identifier may be used by the system provider or payment service provider to associate the user with a particular account as further described herein.

The webmail provider devices 1104 may be maintained, for example, by a webmail provider, offering web-based email and/or other services, or over the network 1114. In this regard, the webmail provider device 1104 may include a database including authentication information (e.g., username and passwords) for users having an account with the respective webmail provider operating the webmail provider device 1104.

Figure 12:
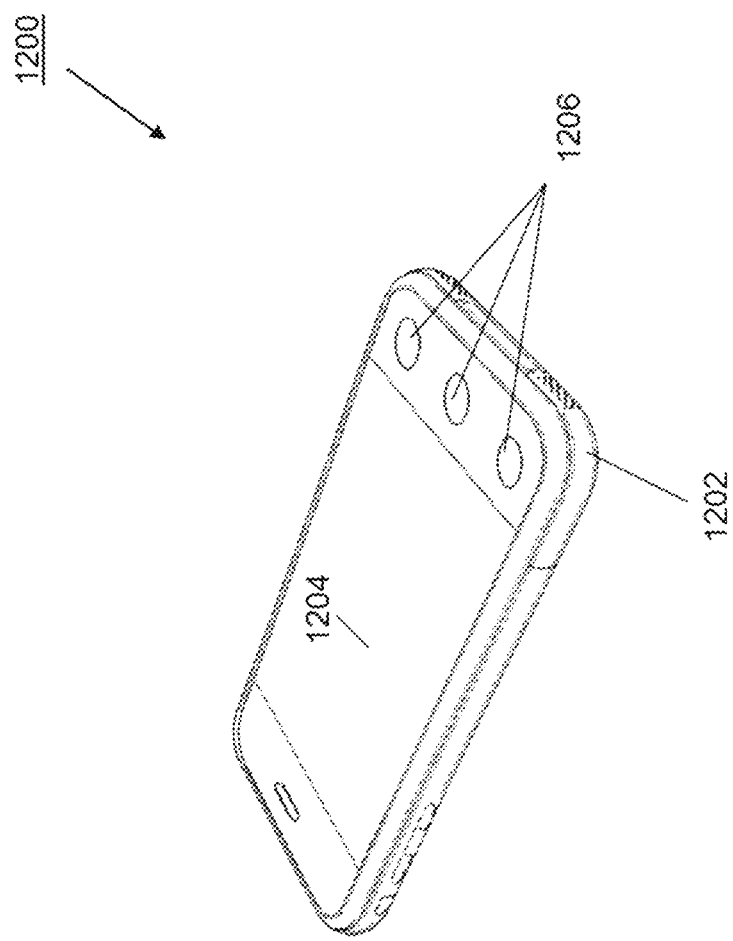
FIG. 12 is a perspective view illustrating an embodiment of a user device.

Referring now to FIG. 12, an embodiment of a user device 1200 is illustrated. The user device 1200 may be the user device 300 or 1102 discussed above. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 13:
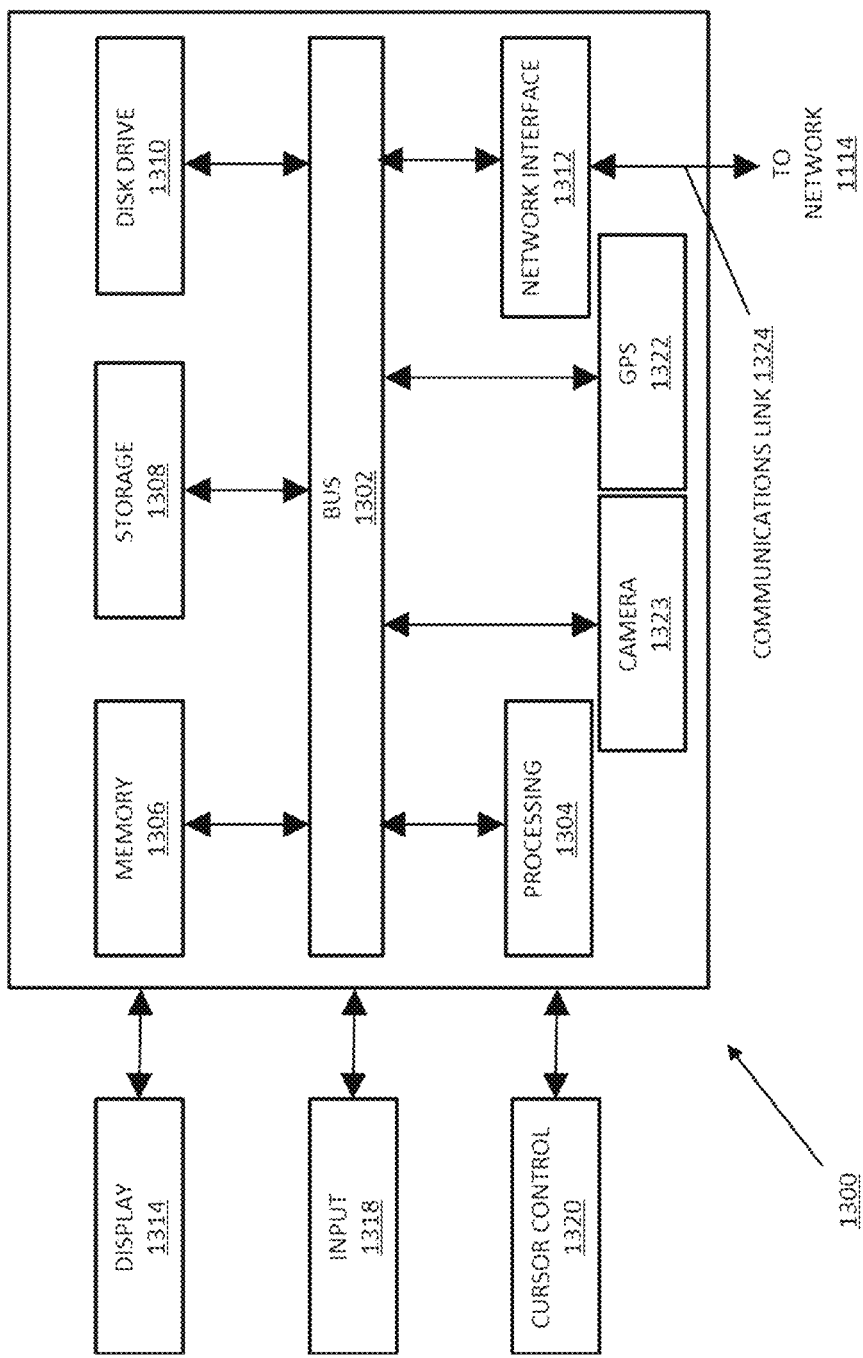
FIG. 13 is a schematic view illustrating an embodiment of a computer system.

Referring now to FIG. 13, an embodiment of a computer system 1300 suitable for implementing, for example, the user devices 300, 1102, 1200, webmail provider devices 1104, and/or system provider device 1110, is illustrated. It should be appreciated that other devices utilized by customers, webmail providers, and/or system providers in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user devices 300, 1102, 1200, webmail provider devices 1104, and/or system provider device 1110. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302.

In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
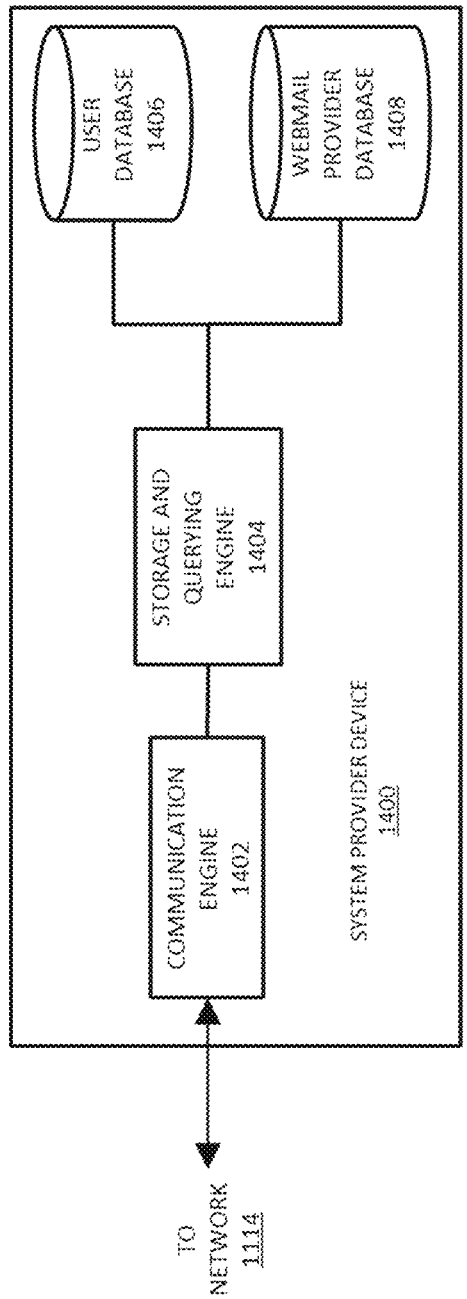
FIG. 14 is a schematic view illustrating an embodiment of a system provider device.

Referring now to FIG. 14, an embodiment of a system provider device 1400 is illustrated. In an embodiment, the device 1400 may be the system provider devices discussed above. The device 1400 includes a communication engine 1402 that is coupled to the network 1114 and to storage and querying engine 1404 that is coupled to a user information database 1406 and a webmail provider database 1408. The communication engine 1402 may be software or instructions stored on a computer-readable medium that allows the device 1400 to send and receive information over the network 1114. The storage and querying engine 1404 may be software or instructions stored on a computer-readable medium that, when executed by a processor, is configured receive a request to create a file management account, receive a selection of one or more account configuration options, provide a user interface for user interaction with files in the file management account, copy file(s) to and/or from the user interface, or select a file for viewing from the user interface, as well as provide any of the other functionality that is discussed above. While the databases 1406 and 1408 have been illustrated as located in the device 1400, one of skill in the art will recognize that they may be connected to the storage and querying engine 1404 through the network 1114 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A file management system, comprising:
  a non-transitory memory; and
  one or more hardware processors coupled to the non-transitory memory and configured to read instructions from the non-transitory memory to cause the system to perform operations comprising:
    accessing a database management system (DBMS) layer that interfaces and mediates communication between a plurality of webmail providers and a user interface (UI) application including a file browser associated with an aggregated mailbox storage space, wherein a mailbox storage is associated with a respective user webmail account for each of the plurality of webmail providers;
    aggregating available storage space from the mailbox storage associated with the respective user webmail account for each of the plurality of webmail providers to provide the aggregated mailbox storage space, wherein the DBMS layer assigns an equal mailbox storage usage percentage for the mailbox storage associated with the respective user webmail account for each of the plurality of webmail providers regardless of an amount of storage space available in the mailbox storage associated with the respective user webmail account for each of the plurality of webmail providers;
    responsive to copying a plurality of files into the file browser, attaching each of the plurality of files to respective draft emails and storing the respective draft emails including each of the plurality of attached files into the aggregated mailbox storage space, wherein the storing the respective draft emails including each of the plurality of attached files into the aggregated mailbox storage space includes storing a first draft email including a first attached file into the mailbox storage of a first one of the plurality of webmail providers and storing a second draft email including a second attached file into the mailbox storage of a second one of the plurality of webmail providers; and
    responsive to a challenge-response test deployed by at least one of the plurality of webmail providers, utilizing a user simulation module interfacing the UI application and the plurality of webmail providers to mimic a human user and automatically and successfully respond to the challenge-response test, without input from the human user and without interrupting the communication between the UI application and the plurality of webmail providers.

2. The system of claim 1, wherein a file management account includes authentication information for the respective user webmail account for each of the plurality of webmail providers.

3. The system of claim 1, wherein the DBMS layer includes a storage and querying engine (SQE) that mediates file storage and retrieval between the UI application and the respective user webmail account for each of the plurality of webmail providers.

4. The system of claim 2, wherein the operations further comprise:
  receiving a selection of account configuration options for the file management account.

5. The system of claim 1, wherein the operations further comprise:
  providing a mapping for each of the plurality of files, by way of a lookup table, between the UI application and the aggregated mailbox storage space.

6. The system of claim 5, wherein the lookup table includes a first entry including identifiers assigned to each of the plurality of files, and wherein the lookup table includes a second entry corresponding to the first entry and including metadata used to identify the respective draft email within a particular one user webmail account to which each of the plurality of files having the corresponding assigned identifier is attached.

7. The system of claim 1, wherein the attaching each of the plurality of files to the respective draft emails and storing the respective draft emails including each of the plurality of attached files further includes adding at least one of subject line metadata, body metadata, or header metadata to each of the respective draft emails.

8. The system of claim 1, wherein the operations further comprise:
  retrieving, by a lookup table data structure, the plurality of files from each of the respective draft emails within a particular one user webmail account.

9. A method for utilizing a file management system, comprising:
  accessing, by a system provider device, a database management system (DBMS) layer that interfaces and mediates communication between a plurality of webmail providers and a user interface (UI) application including a file browser associated with an aggregated mailbox storage space, wherein a mailbox storage is associated with a respective user webmail account for each of the plurality of webmail providers;
  aggregating, by the system provider device, available storage space from the mailbox storage associated with the respective user webmail account for each of the plurality of webmail providers to provide the aggregated mailbox storage space, wherein the DBMS layer assigns an equal mailbox storage usage percentage for the mailbox storage associated with the respective user webmail account for each of the plurality of webmail providers regardless of an amount of storage space available in the mailbox storage associated with the respective user webmail account for each of the plurality of webmail providers; and responsive to copying, by the system provider device, a plurality of files into the file browser, attaching each of the plurality of files to respective draft emails and storing the respective draft emails including each of the plurality of attached files into the aggregated mailbox storage space, wherein the storing the respective draft emails including each of the plurality of attached files into the aggregated mailbox storage space includes storing a first draft email including a first attached file into the mailbox storage of a first one of the plurality of webmail providers and storing a second draft email including a second attached file into the mailbox storage of a second one of the plurality of webmail providers.

10. The method of claim 9, wherein a file management account includes authentication information for the respective user webmail account for each of the plurality of webmail providers.

11. The method of claim 9, wherein the DBMS layer includes a storage and querying engine (SQE) that mediates file storage and retrieval between the UI application and the respective user webmail account for each of the plurality of webmail providers.

12. The method of claim 10, further comprising:
receiving, by the system provider device, a selection of account configuration options for the file management account.

13. The method of claim 9, further comprising:
providing, by the system provider device, a mapping for each of the plurality of files, by way of a lookup table, between the UI application and the aggregated mailbox storage space.

14. The method of claim 9, further comprising:
retrieving, by the system provider device and a lookup table data structure, the plurality of files from each of the respective draft emails within a particular one user webmail account.

15. A non-transitory machine-readable medium having stored thereon machine-readable instructions executable to cause a machine to perform operations comprising:
accessing a database management system (DBMS) layer that interfaces and mediates communication between a plurality of webmail providers and a user interface (UI) application including a file browser associated with an aggregated mailbox storage space, wherein a mailbox storage is associated with a respective user webmail account for each of the plurality of webmail providers, and wherein a first available storage space for the mailbox storage for a first one of the plurality of webmail providers is different than a second available storage space for the mailbox storage for a second one of the plurality of webmail providers;

aggregating available storage space from the mailbox storage associated with the respective user webmail account for each of the plurality of webmail providers to provide the aggregated mailbox storage space, wherein the DBMS layer assigns an equal mailbox storage usage percentage for the mailbox storage associated with the respective user webmail account for each of the plurality of webmail providers regardless of an amount of storage space available in the mailbox storage associated with the respective user webmail account for each of the plurality of webmail providers; and responsive to copying a plurality of files into the file browser, attaching each of the plurality of files to respective draft emails and storing the respective draft emails including each of the plurality of attached files into the aggregated mailbox storage space, wherein the storing the respective draft emails including each of the plurality of attached files into the aggregated mailbox storage space includes storing a first draft email including a first attached file into the mailbox storage of a first one of the plurality of webmail providers and storing a second draft email including a second attached file into the mailbox storage of a second one of the plurality of webmail providers.

16. The non-transitory machine-readable medium of claim 15, wherein the operations further comprise:
providing a mapping for each of the plurality of files, by way of a lookup table, between the UI application and the aggregated mailbox storage space.

17. The non-transitory machine-readable medium of claim 16, wherein the lookup table includes a first entry including identifiers assigned to each of the plurality of files, and wherein the lookup table includes a second entry corresponding to the first entry and including metadata used to identify the respective draft email within a particular one user webmail account to which each of the plurality of files having the corresponding assigned identifier is attached.

18. The non-transitory machine-readable medium of claim 15, wherein the operations further comprise:
retrieving, by a lookup table data structure, the plurality of files from each of the respective draft emails within a particular one user webmail account.

19. The system of claim 1, wherein the operations further comprise:
responsive to determining that usage of the mailbox storage for one of the plurality of webmail providers has exceeded a predetermined memory usage threshold, generating an alert via the UI application; and
re-allocating the mailbox storage usage percentage for the mailbox storage associated with the respective user webmail account for each of the plurality of webmail providers.

* * * * *